3,396,049
CELLULOSIC SUBSTRATES COATED WITH
STYRENE INTERPOLYMER LATEXES
George J. Anderson, Wilbraham, and Joel Fantl, Springfield, Mass., assignors to Monsanto Company, St. Louis, Mo., a corporation of Delaware
No Drawing. Filed July 2, 1964, Ser. No. 380,082
6 Claims. (Cl. 117—94)

ABSTRACT OF THE DISCLOSURE

Disclosed herein is a cellulosic paper substrate coated with a styrene interpolymer latex, said latex having been polymerized in the presence of a particular sole emulsifier, which emulsifier may be, for example, the ammonium salt of a partial ester of 2-butoxyethanol with a styrene maleic anhydride copolymer.

---

This invention relates to a coating composition and in particular to a coating composition used on cellulosic paper substrates.

In the art, it is known to use certain styrene latices as coating compositions for cellulosic paper substrates. In some cases it is necessary to blend a latex of a styrene homopolymer and a latex of a styrene interpolymer in order to obtain proper film-forming characteristics. Unfortunately, such systems have been known to have poor block resistance, poor coating holdout, poor gloss or a combination of these. Attempts have been made to employ only styrene interpolymers as the coating composition. Unfortunately, in some polymer compositions, these require very narrow control of the monomer ratios to prepare a copolymer having the same desirable properties. Other polymer systems are lacking in block resistance or coating holdout or poor gloss or combinations of these. For obvious reasons a styrene homopolymer is not a good coating composition by itself since it is essentially a non-film former.

It has now been surprisingly discovered that by employing certain specific emulsifiers in preparing emulsion polymerized styrene interpolymer compositions, the composition can be used successfully alone as coating compositions for cellulosic substrates wherein the coating exhibits excellent blocking properties and excellent coating holdout while still maintaining the desirable property of excellent or high gloss.

Therefore, it is an object of this invention to provide a coated cellulosic paper substrate.

Other objects of this invention will in part be obvious and will in part be set out and appear hereinafter.

The objects of this invention are attained by coating a cellulosic substrate on at least one side thereof with an emulsion polymerized styrene interpolymer having a particular polymer as the sole emulsifier.

The following examples are set forth to illustrate more clearly the principle and practice of this invention to those skilled in the art and are not to be construed as limitations on the invention. Unless otherwise stated all parts and percentages are on a weight basis.

Example I

A styrene-butadiene coating composition consisting of 83–17 weight ratio of styrene to butadiene is prepared by an emulsion polymerization process employing as the sole emulsifier the ammonium salt of the 2-butoxyethanol partial ester of a styrene-maleic anhydride copolymer. The reaction is carried out in a reaction vessel fitted with a dropping funnel and at a temperature of about 60° C.

This composition is designated as A.

Example II

Example I is repeated except that in place of the ammonium salt of the 2-butoxyethanol partial ester of a styrene-maleic anhydride copolymer as the emulsifying agent, an emulsifying system of an ethylene-oxide condensate of nonylphenol and a sodium salt of an alkyl aryl polyether sulfate.

This composition is designated as B.

Example III

Example I is repeated except that in place of the styrene-butadiene copolymer, a copolymer of styrene and ethyl acrylate is employed. The copolymer has a weight ratio of about 75/25 weight percent of the styrene and ethyl acrylate respectively.

This composition is designated as C.

Example IV

Example III is repeated except that in place of the ammonium salt of the 2-butoxyethanol partial ester of a styrene-maleic anhydride copolymer as the emulsifying agent, a conventional emulsifying system is employed consisting of a mixture of an ethylene-oxide condensate of nonylphenol and a sodium salt of an alkyl aryl polyether sulfate.

This composition is designated as D.

Example V

Cellulosic paper cups are coated on the interior thereof with compositions A, B, C and D of the above examples by the flush-coating technique. The flush-coating technique involves placing a given quantity of the coating composition in the cup and then spinning the cup at 2000 r.p.m. for one second. In this example, 5 grams of each composition A, B, C and D are placed separately in the cups before spinning. The coated cups are then dried in an oven for 2 minutes at 275° F. The amount of composition picked up with each cup is about 0.50 gram.

Example VI

The coated cups of Example V are then tested for antiblock properties. Cups coated with the same composition are nested in stacks of about 15 cups each with a 2 lb. weight on top. Each stack is then placed in an oven at 190° F. for 16 hours at a relative humidity of about 90%. The stacks are removed and allowed to cool to room temperature. The weights are removed and each stack is examined for ease with which the cups freely separate or part from each other by their own weight.

The cups coated with compositions A and C, which are the compositions of this invention, freely separated without sticking. Cups coated with compositions B and D could be separated only with force and resulted in rupturing of either the coating or the paper fibers.

This example shows that the coating compositions of this invention have excellent blocking or non-sticking properties at the higher temperature.

Example VII

This example is set forth to show coating holdout and stain resistance of cups coated with compositions of this invention.

Cellulosic paper cups are coated in the same manner as in Example VI with compositions A, B, C and D. The coated cups are tested for stain resistance by filling each cup with hot black percolated coffee at a temperature of about 210° F. The filled cups are allowed to stand for 20 minutes. The coffee is removed and the interior surface of each cup is examined for stain. Cups coated with compositions A and C had no staining while cups coated with compositions B and D showed signs of staining particularly along the seams and fillets of the cup. This indicates poor coating coverage of the interior surface with compositions B and D.

This invention is directed to cellulosic paper substrates having coated on one side thereof a continuous coating consisting of an emulsion polymerized styrene interpolymer latex having as the sole emulsifier 10–40 parts of a polymer by weight of the total emulsion solids wherein the polymer is a salt of a partial ester of a copolymer of maleic-anhydride and a vinylidene aromatic compound having a molecular weight of 1000–20,000 and having in its structure recurring groups of the formulae:

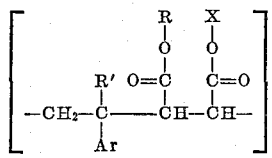

and

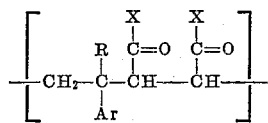

with the groups of Formula I constituting 20–100% of the total of the groups of I and II. In the above formulae, R is any organic radical of 1–20 carbon atoms. R′ in the above formulae is selected from the group consisting of hydrogen, an alkyl radical of 1–5 carbon atoms, a halogen and a nitrile and mixtures thereof while Ar is an aromatic radical of 1–2 benzene rings. The X portion of the above-identified formula is selected from the group of ammonium, substituted ammonium and alkali metal ions. The substituted ammonium ions that are particularly useful in the practice of this invention are ions formed from such compounds as mono-, di-, and trimethyl amines, mono-, di- and triethyl amines, mono-, di-, and triisopropyl amines, mono-, di- and triethanol amines, 2-methyl-2-amino-propanol-1, and mixtures thereof. The alkali metal ions are lithium, sodium, potassium, etc. The styrene interpolymer of this invention is an interpolymer containing at least 40 weight percent of styrene with the balance thereof being at least one other monomer which is interpolymerizable with styrene and which styrene interpolymer preferably has a glass transition temperature of at least 30° C. In a preferred embodiment of this invention the coating composition of claim 1 is one wherein the groups of Formula I constitute 30–70 weight percent total of the groups of I and II.

The surprising discovery of the instant invention is that when employing the specific type of emulsifier as the sole emulsifying agent, where heretofore has not been known as an emulsifier for emulsion polymerized styrene interpolymer latexes, the styrene interpolymer so produced is completely satisfactory for coating cellulosic paper substrates. Up to this time the use of such styrene interpolymers required that they be blended with other materials in order to achieve proper block properties and proper stain resistant coatings. With the use of the specific emulsifier as set forth previously, such styrene interpolymer latexes can be used directly as coatings for cellulosic paper substrates.

In the practice of this invention the emulsifier employed for preparing the coating composition of an emulsion polymerized styrene interpolymer latex is a salt of a partial ester of a copolymer of maleic anhydride and a vinylidene aromatic compound. As stated previously, the ester portion of the emulsifier can be any organic radical of 1–20 carbon atoms consisting of carbon and hydrogen with or without oxygen, nitrogen and other elements. It is preferably selected from the group consisting of alkyl, aryl, alkaryl, aralkyl and cycloalkyl radicals. Particularly useful are the alkyl radicals such as methyl, ethyl, propyl, butyl, dodecyl, etc.; the aromatic radicals such as benzyl, etc.; the ether radicals such as butoxy ethyl, propoxy ethyl, furfuryl, methyl ether of diethylene glycol, methyl ether of triethylene glycol, thioethers, etc.; the amino radicals such as dimethyl amino ethyl, etc.; and the cycloalkyl radicals such as cyclo hexyl, cyclo pentyl, etc. The vinylidene aromatic compounds which may be polymerized with a maleic anhydride include such compounds as styrene, alpha methylstyrene, vinyl toluene, vinyl xylene, 2,4-dimethylstyrene, o-, m-, and p-chlorostyrene, 2,5-dichlorostyrene, 2-methyl-4-chlorostyrene, vinyl naphthalene and alpha cyanostyrene. Such salts of a partial ester of the polymer of maleic anhydride and a vinylidene aromatic compound which can be used in place of the 2-butoxyethanol ester of a styrene-maleic anhydride copolymer in the examples are the 2-butoxyethanol ester of alpha methylstyrene maleic anhydride, vinyl toluene maleic anhydride, vinyl xylene maleic anhydride, 2,4-dimethylstyrene maleic anhydride, o-chlorostyrene maleic anhydride, 2-methyl-4-chlorostyrene maleic anhyldride and alpha cyanostyrene-maleic anhydride.

The emulsion polymerized styrene interpolymer latex is prepared at a pH of 7 or above and using only as the sole emulsifier a salt of a partial ester of a styrene-maleic anhydride copolymer. As stated previously, the styrene interpolymer employed herein is one which contains at least 40 weight percent of styrene with the balance thereof being at least one other monomer which is interpolymerizable with styrene. In addition, the styrene interpolymer has a glass transition temperature of at least 30° C.

The styrene interpolymer of this invention can be used successfully in coating cellulosic paper substrates. The styrene interpolymers may be either copolymers or terpolymers and include such systems as styrene-butadiene, styrene isoprene, styrene methyl acrylate, styrene ethyl acrylate, styrene diethyl maleate, styrene diethyl fumarate, alpha methyl styrene butadiene, styrene butyl acrylate, other esters of maleic acid or fumaric acid with 1–18 carbon atom monocarboxylic alcohols which esters are readily copolymerizaable with the styrene, etc. The preferred styrene interpolymer employed in the practice of this invention is a styrene-butadiene copolymer of at least 50% styrene with the balance thereof being butadiene.

In some instances it may be also desirable to include other materials with the coating composition set forth above. Such materials include the non-reactive stable siloxane polymeric emulsions, natural and synthetic waxes, polyethylene, etc. These materials act as slip agents so that when coated cups employing the composition of this invention are nested as in a vending machine they will easily and freely separate. It might be said that these slip agents act as a lubricant without affecting the quality of the coating or the taste of the fluid to be contained in the cup. It is also feasible that other materials can be added to the latex in order to alter the flow properties thereof.

The coating compositions as set forth herein find extensive use in the coating of cellulosic paper substrates such as paper cups, paper plates, laminated paper sheets, paperboard, paper containers, etc. These products may be coated on either the interior or exterior or both surfaces thereof. Such containers find excellent use for holding both hot and cold drinking fluids, dairy products such as milk, butter, cheese, etc., meats, produce products, etc. In particular it has found excellent use in coating cellulosic paper drinking cups.

It will thus be seen that the objects set forth above among those made apparent from the description are efficiently attained and since changes may be made in carrying out the above process and in the compositions set forth without departing from the scope of this invention, it is intended that all matters contained from the above description shall be interpreted as illustrative and not in a limiting sense.

What is claimed is:

1. A cellulosic paper substrate coated on one side with a continuous coating consisting of a styrene interpolymer latex, said styrene interpolymer:
(a) containing at least 40 weight percent of styrene with the balance thereof being at least one other monomer which is interpolymerizable with styrene, and
(b) having been polymerized by emulsion polymerization in the presence of a sole emulsifier, said sole emulsifier:
(1) constituting 10–40 parts by weight of the total emulsion solids;
(2) having a molecular weight of 1,000–20,000 and
(3) being a salt of a partial ester of a copolymer of maleic anhydride and a vinylidene aromatic compound, said salt having in its structure recurring groups of the formulae:

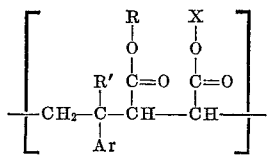   I and

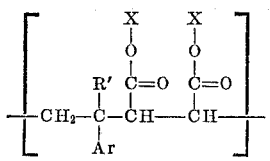   II wherein:
(a) the groups of Formula I constitute 20–100% of the total of the groups of Formulae I and II, (b) R is any organic radical of 1–20 carbon atoms,
(c) R' is selected from the group consisting of hydrogen, an alkyl radical of 1–5 carbon atoms, a halogen, a nitrile and mixtures thereof,
(d) Ar is an aromatic radical of 1–2 benzene rings, and,
(e) X is selected from the group consisting of ammonium, substituted ammonium and alkali metal ions.

2. The coated cellulosic paper substrate of claim 1 wherein the groups of Formula I constitute 30–70 weight percent of the total of groups I and II.

3. The coated cellulosic paper substrate of claim 1 wherein the sole emulsifier is the ammonium salt of a partial ester of a styrene-maleic anhydride copolymer.

4. The coated cellulosic paper substrate of claim 1 wherein the sole emulsifier is the ammonium salt of the 2-butoxyethanol ester of a styrene-maleic anhydride copolymer.

5. The coated cellulosic paper substrate of claim 1 wherein the styrene interpolymer is a copolymer of styrene and butadiene.

6. The coated cellulosic paper substrate of claim 1 wherein the cellulosic paper substrate is a cup.

References Cited
UNITED STATES PATENTS 2,994,677  8/1961  Bohnert et al.
3,260,690  7/1966  Bohnert et al.
3,261,709  7/1966  Shulman.

WILLIAM D. MARTIN, *Primary Examiner.*

T. G. DAVIS, *Assistant Examiner.*